United States Patent
Toda et al.

(10) Patent No.: US 7,274,643 B2
(45) Date of Patent: Sep. 25, 2007

(54) INFORMATION RECORDING AND REPRODUCING APPARATUS AND INFORMATION RECORDING MEDIUM

(75) Inventors: Tsuyoshi Toda, Kodaira (JP); Hiroyuki Minemura, Kokubunji (JP); Masaaki Kurebayashi, Ebina (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 612 days.

(21) Appl. No.: 10/642,461

(22) Filed: Aug. 15, 2003

(65) Prior Publication Data

US 2005/0088940 A1    Apr. 28, 2005

(30) Foreign Application Priority Data

Jan. 28, 2003    (JP)    ............... 2003-018162

(51) Int. Cl.
*G11B 7/125*    (2006.01)
(52) U.S. Cl. .............. 369/53.27; 369/47.53; 369/13.26; 369/116
(58) Field of Classification Search ............ 369/44.27, 369/47.53, 53.27, 116, 59.11, 53.35, 59.18, 369/53.11, 53.31, 13.26
See application file for complete search history.

(56) References Cited

U.S. PATENT DOCUMENTS 5,815,477 A * 9/1998 Kimura et al. .......... 369/47.53
6,339,578 B1 * 1/2002 Sasaki et al. .......... 369/116
6,418,102 B1 * 7/2002 Suga .................. 369/47.53
6,678,220 B1 * 1/2004 Saga .................. 369/44.27

FOREIGN PATENT DOCUMENTS

| JP | 09-161272 | 6/1997 |
| JP | 2001-076341 | 3/2001 |
| JP | 2001-243626 | 9/2001 |
| JP | 2001-297436 | 10/2001 |
| JP | 2002-342930 | 11/2002 |

\* cited by examiner

*Primary Examiner*—Andrea Wellington
*Assistant Examiner*—Kim-Kwok Chu
(74) *Attorney, Agent, or Firm*—Townsend and Townsend and Crew LLP (57) ABSTRACT

It is an object of the present invention to provide an information recording and reproducing technique capable of improving the reliability of information recorded on a recording medium. A recording condition comprising amplitude information and the ratio of the amplitude to the recording power is previously recorded on the recording medium. Using this previously recorded information, information is recorded and then immediately reproduced to calculate the optimum recording power from the amplitude information obtained from the reproduced signal. By adapting the recording condition accordingly, it is possible to secure reliability of information in performance.

7 Claims, 7 Drawing Sheets

INFORMATION RECORDING AND REPRODUCING APPARATUS AND INFORMATION RECORDING MEDIUM

BACKGROUND OF THE INVENTION

1. Field of the Invention

The present invention relates to an information recording and reproducing technique for recording and reproducing information to and from an information recording medium and, in particular, to an information recording and reproducing technique for recording and reproducing information to and from an information recording medium by using laser light.

2. Description of the Related Art

Conventionally in a conventional optical information recording and reproducing apparatus capable of recording and reproducing information onto and from an optical recording medium such as an optical disk, after information is recorded in a disk area, a part of the recorded information is reproduced, the Beta value of the reproduced signal is calculated to judge the recording quality and, if the Beta value is not within the allowable range, error information is output to a host computer (for example, see Japanese Patent Laid-Open No. 9-161272 (pages 4 through 6, FIG. 1)).

SUMMARY OF THE INVENTION

The above-mentioned conventional technique judges the recording quality but does not do any processing to improve the recording quality although error information is output to a host computer. The above-mentioned conventional technique is not concerned with any processing to improve the recording quality.

It is an object of the present invention to provide an information recording and reproducing technique capable of improving the reliability of information recorded on a recording medium.

According to the present invention to achieve the above-mentioned object, there is provided an information recording and reproducing apparatus having a controller comprising means for detecting amplitude information from a reproduced signal; means for converting the detected signal to a digital signal; and means for calculating on the digital signal obtained; wherein the controller secures reliability of recorded and reproduced information by adapting the recording power based on the stored amplitude information about the reproduced signal and the recording condition recorded on the recording medium, such as asymmetry and change ratio of the asymmetry to the power (change ratio of the amplitude to the recording power).

DETAILED DESCRIPTION OF THE PREFERRED EMBODIMENTS

Figure 1:
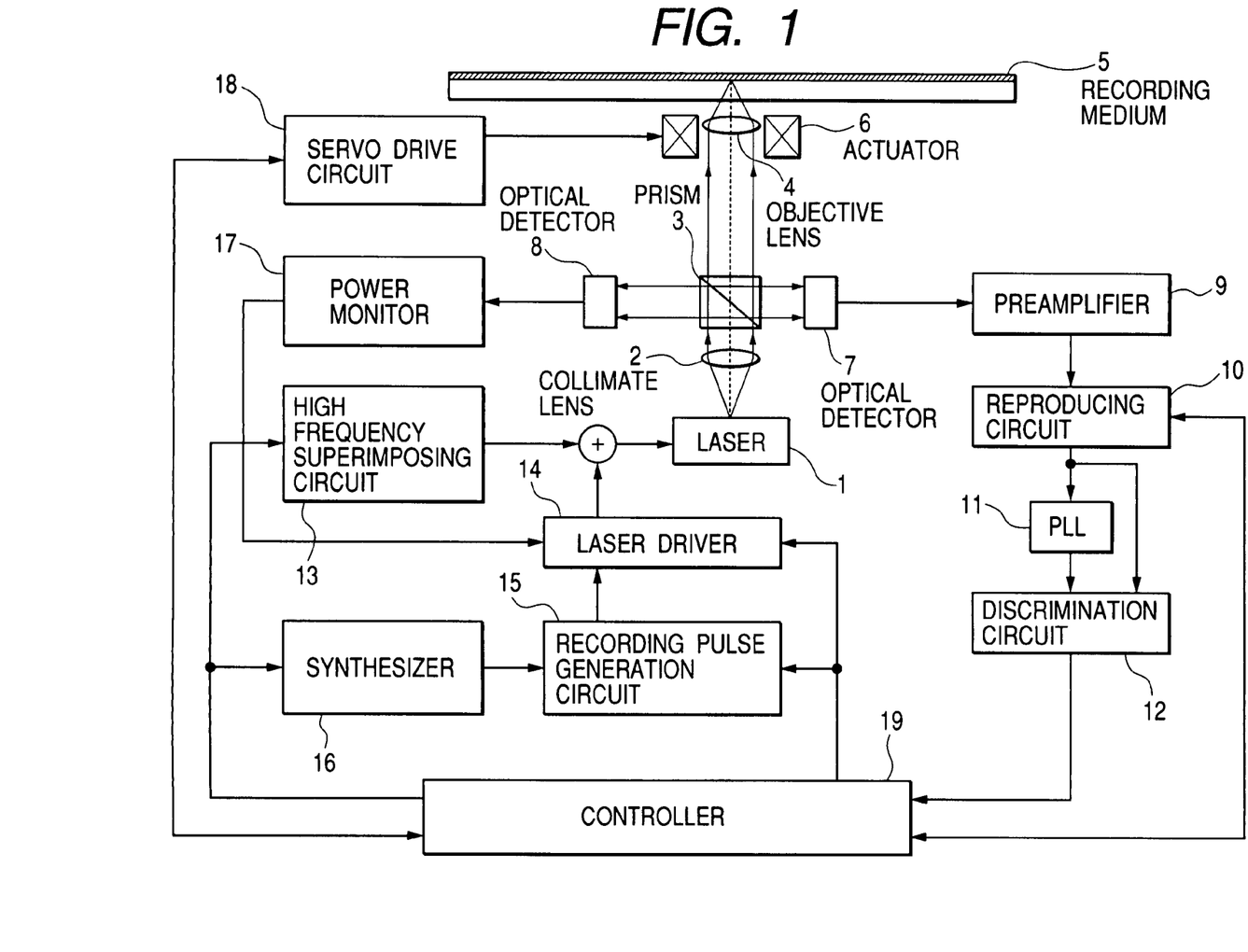
FIG. 1 is a block diagram showing the configuration of an optical information recording and reproducing apparatus according to the present invention.

Embodiments of the present invention will be described in detail with reference to the accompanying drawings. Firstly, FIG. 1 shows the configuration of an optical information recording and reproducing apparatus, an embodiment of the present invention. A semiconductor laser 1 oscillates laser light. Laser light from the semiconductor laser 1 is made parallel through a collimate lens 2. Light which passed through the collimate lens 2 is guided to an optical detector 8 by a prism 3. In addition, reflected light from a recording medium 5 is guided to an optical detector 7 by the prism 3. Light which passed through the collimate lens 2 and the prism 3 is converged by an objective lens 4 so as to form an optical spot on the recording medium 5. In the present embodiment, the recording medium 5 is an optical disk such as a DVD disk. An actuator 6 drives the objective lens 5 in order to control the shape and position of the optical spot formed on the recording medium 5. A preamplifier 9 amplifies an electric signal which is obtained through photoelectric conversion by an optical detector 9. Operations of a reproducing circuit 10, a PLL circuit 11, a discrimination circuit 12, a high frequency superimposing circuit 13, a laser driver 14, a recording pulse generation circuit 15, a synthesizer 16, a power monitor circuit 17, a servo drive circuit 18 and a controller 19 will be described later.

This optical information recording and reproducing apparatus includes an optical head having the semiconductor laser 1 as the main component, a recording processing system centering on the recording pulse generation circuit 15 and a reproduction processing system centering on the reproducing circuit 10 in which a reproduced signal obtained by the optical head is converted to information. As apparent from FIG. 1, the recording medium 5 for storing information includes a recording film (a portion given hatching) and a base plate to support the film. In addition, as described later, information about the recording condition, including recording power and amplitude information such as asymmetry and change ratio of the asymmetry to the power (change ratio of the amplitude to the recording power), is previously embedded onto the recording medium 5.

Instructions from an upper host are decoded in the controller 19. Also in the controller 19, information/data from the upper host is converted to a code sequence conforming to a modulation format employed therein for data recording. The synthesizer 16 generates a reference clock for the whole apparatus. If a recording method called ZCAV (Zoned Constant Angular Velocity) is employed as a technique for raising the capacity, the oscillation frequency of the synthesizer 16 is changed within each zone of the recording medium 5 so that the changing reference clock makes the recording density substantially constant in the inner and outer tracks. If a recording method called ZCLV (Zoned Constant Linear Velocity) is employed, the oscillation frequency of the synthesizer 16 is fixed within each zone while the rotation speed of a spindle motor (not shown) which rotates the recording medium 5 is changed so as to make the linear speed substantially constant in the inner and outer tracks.

A servo mechanism (focus servo and tracking servo) which controls the shape and position of the optical spot to implement recording/reproduction of information is configured in such a manner that a focus error signal and a track error signal obtained through a cylindrical lens (not shown) and the optical detector (quadrisection) 7 are given to an input (not shown) of the controller 19 which in turn outputs a servo signal to the servo drive circuit 18 in order to move the objective lens 4 by supplying a drive current to the actuator 6 by which the shape and position of the optical spot formed on the recording medium are controlled.

In addition, when information is recorded, a code sequence from the controller 19, obtained through modulation according to the data, and the reference clock from the synthesizer 16 go into the recording pulse generation circuit 15 in which they are converted into a recording pulse sequence to control the length and width of each mark to be recorded.

Then, this recording pulse sequence obtained through conversion in the recording pulse generation circuit 15 is firstly entered into the laser driver 14 to drive the semiconductor laser 1 which is oscillated to emit high power when a recording current is supplied from the laser driver 14. The light emitted from the semiconductor laser 1 is made parallel through the collimate lens 2 and traveled through the prism 3 to form an optical spot on the recording medium 5 due to the objective lens 4 so that marks are recorded according to the code sequence of the recording pulse sequence.

Note that since the high frequency superimposing circuit 13 is provided for suppressing laser noise derived from the semiconductor laser 1, in view of the life of the laser, it may be designed to turn off when information is recorded/erased or overwritten.

Figure 3:
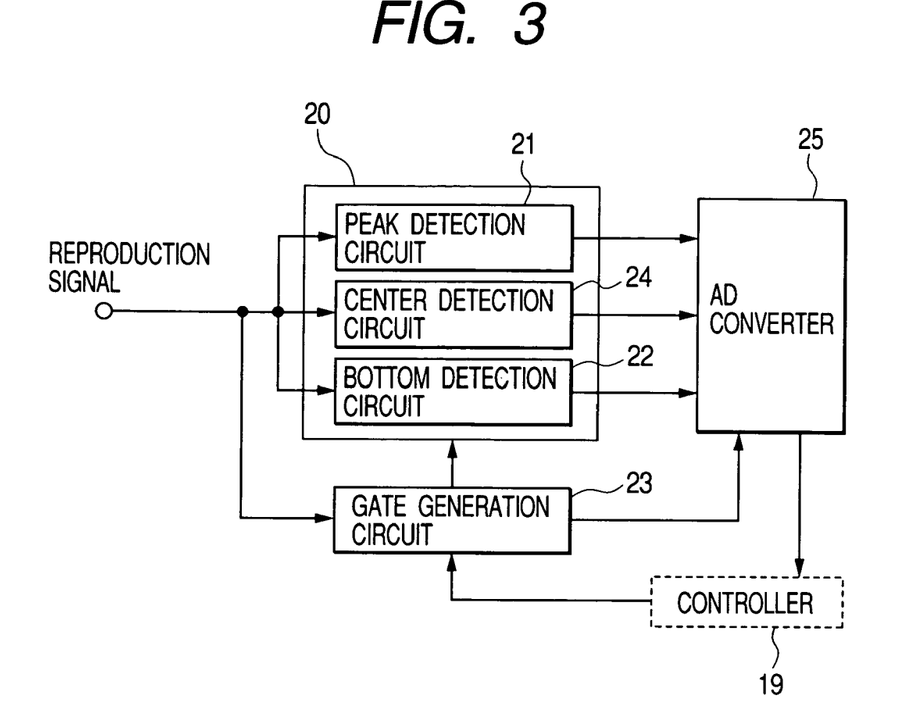
FIG. 3 is a block diagram showing the configuration of a circuit to detect amplitude levels of a reproduced signal according to the present invention.

Meanwhile, in the optical information recording and reproducing apparatus of the present figure, when information recorded as mentioned above is reproduced, the semiconductor laser 1 is oscillated to emit light at low power to the recording medium 5. Along an separate optical path formed by the prism 3, the reflected light from the recording medium 5 is incident on the optical detector 7. An electric signal obtained through photoelectric conversion in this optical detector 7 is amplified by the preamplifier 9 and then entered into the reproduction circuit 10. Being comprised of, for example, a waveform equalization circuit, an automatic gain control circuit, a binarizing circuit, and so on, this reproduction circuit 10 converts the reproduced signal to a binary signal. In addition, the reproduction circuit 10 includes peak, center and bottom detection circuits as shown in FIG. 3.

The binary signal which is output as described above is then entered into the PLL (Phase Locked Loop) circuit 11 for self clocking. A reproduction clock synchronized with the binary signal, obtained by this PLL circuit 11, is entered into the discrimination circuit 12 together with the binary signal for data discrimination. The resulting data-discriminated signal is entered into the controller 19 for data demodulation.

Figure 2:
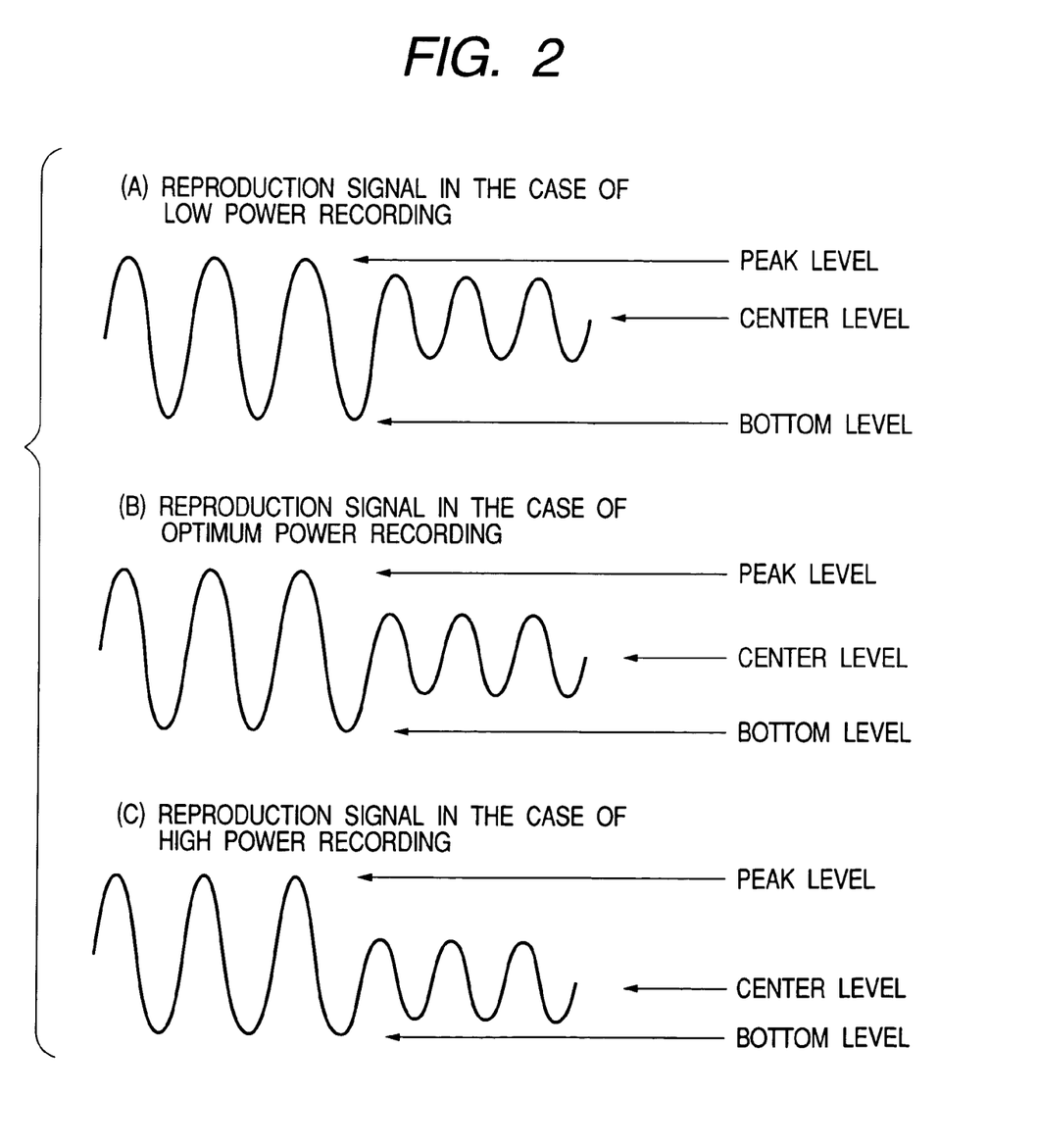
FIG. 2 is a diagram showing how a reproduced signal changes depending on the recording power.

Then, by using FIG. 2, let us describe how the reproduced signal changes depending on the recording power. FIG. 2(A) shows a reproduced signal which is obtained from recorded marks formed on the recording medium 5 by oscillating the semiconductor laser 1 at a power lower than the optimum power. Similarly, FIG. 2(B) shows a reproduced signal in the case of the optimum power and FIG. 2(C) shows a reproduced signal in the case of a power higher than the optimum power.

Shown in each of FIG. 2 is an example of a reproduced signal obtained from a combination of long and short marks which allow the change in the amplitude of the reproduced signal to be observed easily. FIG. 2 is depicted in such a manner that the reproduced signal goes down at marked portions and goes up at space portions. Each long space portion causes the peak level of the reproduced signal while each long mark portion causes the bottom level of the reproduced signal. The mean level of the reproduced signal between mark and space points is the center level of the reproduced signal. This center level substantially equals the median level of the reproduced signal obtained from short marks and spaces which bisects the amplitude there. From these three levels, the Beta value can be calculated as below:

$$\text{Beta}=(A1+A2)/(A1-A2) \qquad \text{Equation (1)}$$

A1=Peak Level—Center Level
A2=Bottom Level—Center Level

This indicates that it is possible to control the recording power according to the relation of the recording power with the Beta value which can be calculated in this manner from three levels; peak level, center level and bottom level.

In addition, let us describe the asymmetry which represents the condition of the reproduced signal's amplitude similarly to Beta. It is defined that Asymmetry=[(peak level+bottom level)/2−center level]/[peak level−bottom level].

Using A1 and A2 defined for Equation (1), this equation results in:

$$\text{Asymmetry}=\tfrac{1}{2}[(A1+A2)/(A1-A2)] \qquad \text{Equation (2)}$$

$$\text{Asymmetry}=\tfrac{1}{2}[\text{Beta}] \qquad \text{Equation (3)}$$

Therefore, the asymmetry value is half the Beta value and there is no difference between them except for the coefficient ½. This indicates that the asymmetry and Beta basically represent the condition of the reproduced signal's amplitude.

Then, referring to FIG. 3, let us describe the configuration of a circuit which is included in the reproduction circuit 10 in order to detect the amplitude levels of the reproduced signal. The reproduced signal output from the preamplifier 9 breaks up into two signals in the reproduction circuit 10. While one goes through the data discrimination processing system including the aforementioned waveform equalization, automatic gain control and binarizing circuits and so on, the other is separately entered into an envelope detection circuit 20. In this envelope detection circuit 20, the peak level, bottom level and center level of the reproduced signal are detected by a peak detection circuit 21, a bottom detection circuit 22 and a center detection circuit 24. In the peak detection circuit 21, the amplitude level (highest level as shown in FIG. 2) corresponding to a long space portion is detected. In the bottom detection circuit 22, the amplitude level (lowest level as shown in FIG. 2) corresponding to a long mark portion is detected. The center detection circuit 24 detects the substantially center level between the amplitude level corresponding to a short mark and the amplitude level corresponding to a short space as shown in FIG. 2.

To detect the peak level, center level and bottom level of the reproduced signal just after recording is done, the gate generation circuit 23 under the command of the controller 19 controls the peak detection circuit 21, bottom detection circuit 22, center detection circuit 24 and AD converter 25.

The peak level, center level and bottom level are supplied to the AD converter 26 for AD conversion and the resulting digital amplitude data are stored in the controller 19. In the controller 19, it is possible to calculate the Beta and asymmetry according to equations (1) and (2) by using these stored data.

Figure 4:
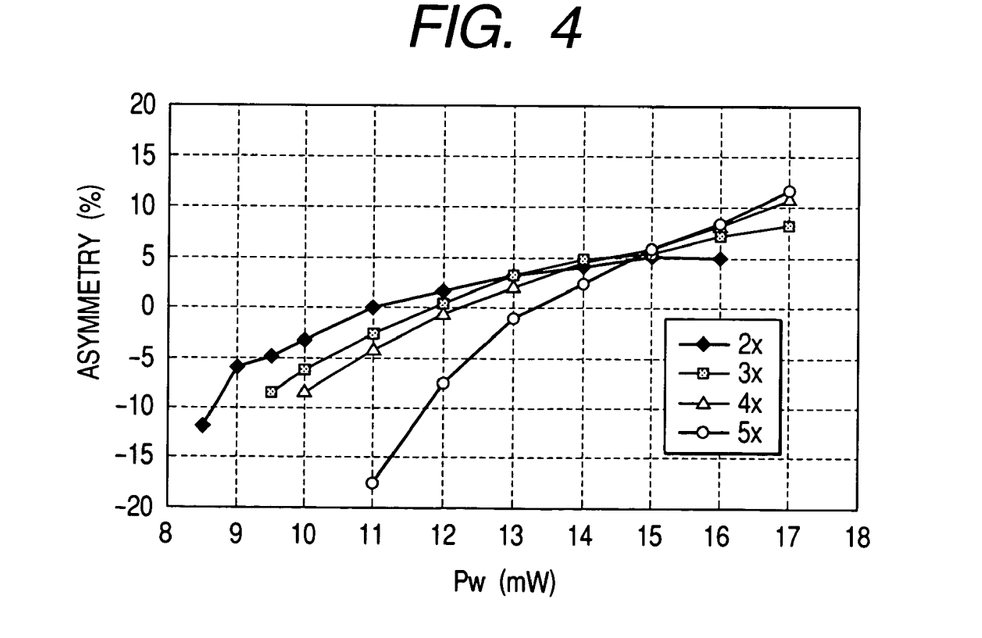
FIG. 4 is a graph showing how the asymmetry is dependent upon the recording power for each linear recording velocity.

FIG. 4 shows dependence of the asymmetry on the recording power. The horizontal axis represents the recording power while the vertical axis represents the asymmetry. The curves were obtained with several linear recording velocities from about 8.2 m/s (denoted as 2×) to about 20.5 m/s (denoted as 5×). FIG. 4 indicates that the change ratio of the asymmetry to the recording power becomes larger according as the linear recording velocity is raised.

Figure 5:
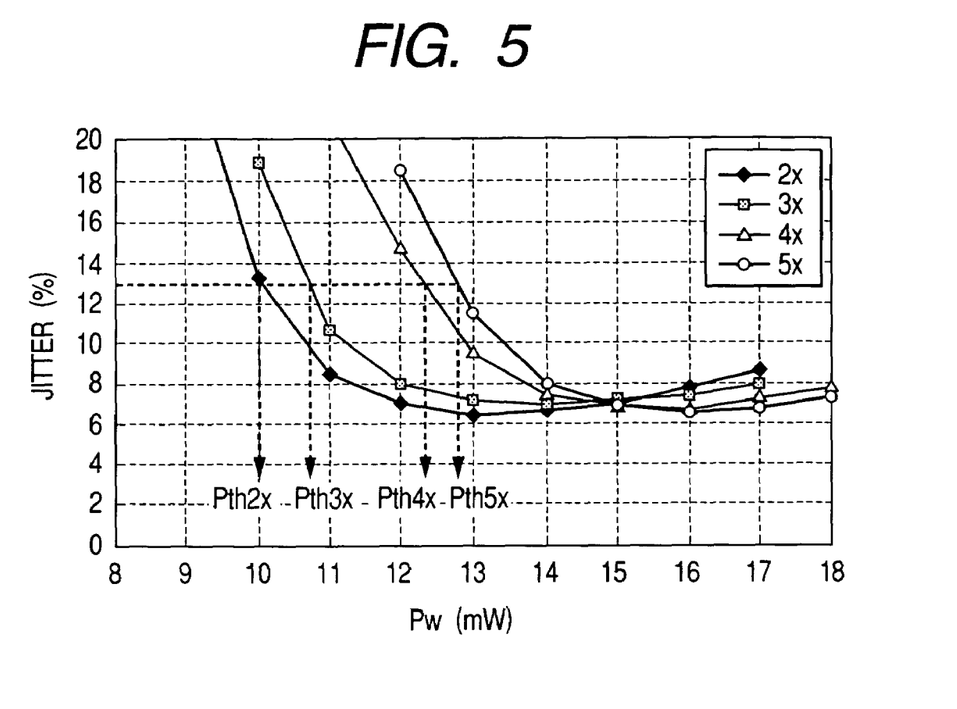
FIG. 5 is a graph showing how the jitter is dependent upon the recording power for each linear recording velocity.

FIG. 5 shows dependence of the jitter on the recording power. The horizontal axis represents the recording power while the vertical axis represents the jitter. Similar to FIG. 4, the linear recording velocity is set as a parameter. In a method for determining the optimum recording power, a recording power which causes a jitter of 13% is taken as the recording power threshold Pth and this Pth is multiplied by an optimum recording power coefficient. The recording power Pw to cause the minimum jitter is about 13 mW for a linear recording velocity of 2×, about 14 mW for a linear recording velocity of 3×, about 15.5 mW for a linear recording velocity of 4×, and about 16 mW for a linear recording velocity of 5×. Pth is about 10 mW (Pth2×) for a linear recording velocity of 2×, about 10.7 mW (Pth3×) for a linear recording velocity of 3×, about 12.3 mW (Pth4×) for a linear recording velocity of 4×, and about 12.8 mW (Pth5×) for a linear recording velocity of 5×. According to these values corresponding to the recording power Pw to cause the minimum jitter and the recording power threshold Pth to cause a jitter of 13%, the optimum recording power coefficient is about 1.3. Although the same optimum recording power coefficient can be used not depending on the linear recording velocity in the case of this recording medium, it is also possible to set a different optimum recording power coefficient for each linear recording velocity.

Figure 6:
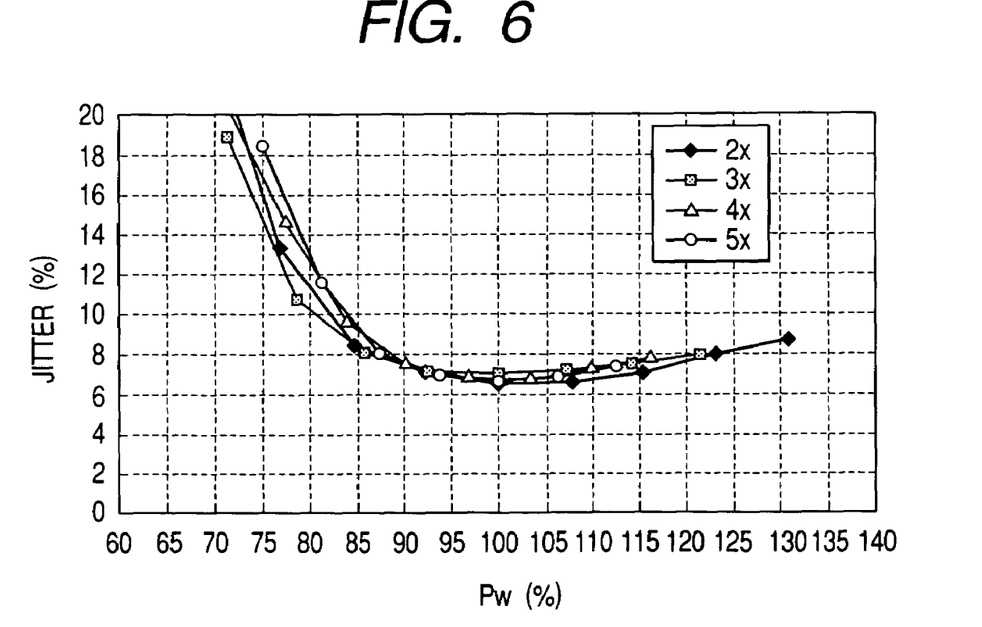
FIG. 6 is a graph showing how the jitter is dependent upon the normalized recording power for each linear recording velocity.

Then, FIG. 6 shows dependence of the jitter on the recording power on a scale with 100% aligned to the recording power Pw (mW) to cause the minimum jitter at each linear recording velocity. The horizontal axis represents the normalized recording power in percent while the vertical axis represents the jitter. The jitter is about 7% at Pw=100% for any of the linear recording velocities of 2× to 5×. Even in the range of Pw=100%±10%, the jitter is roughly not larger than 8%. Thus, it is verified in FIG. 6 that the recording power to cause the minimum jitter, determined in FIG. 5, is the optimum recording power.

Figure 7:
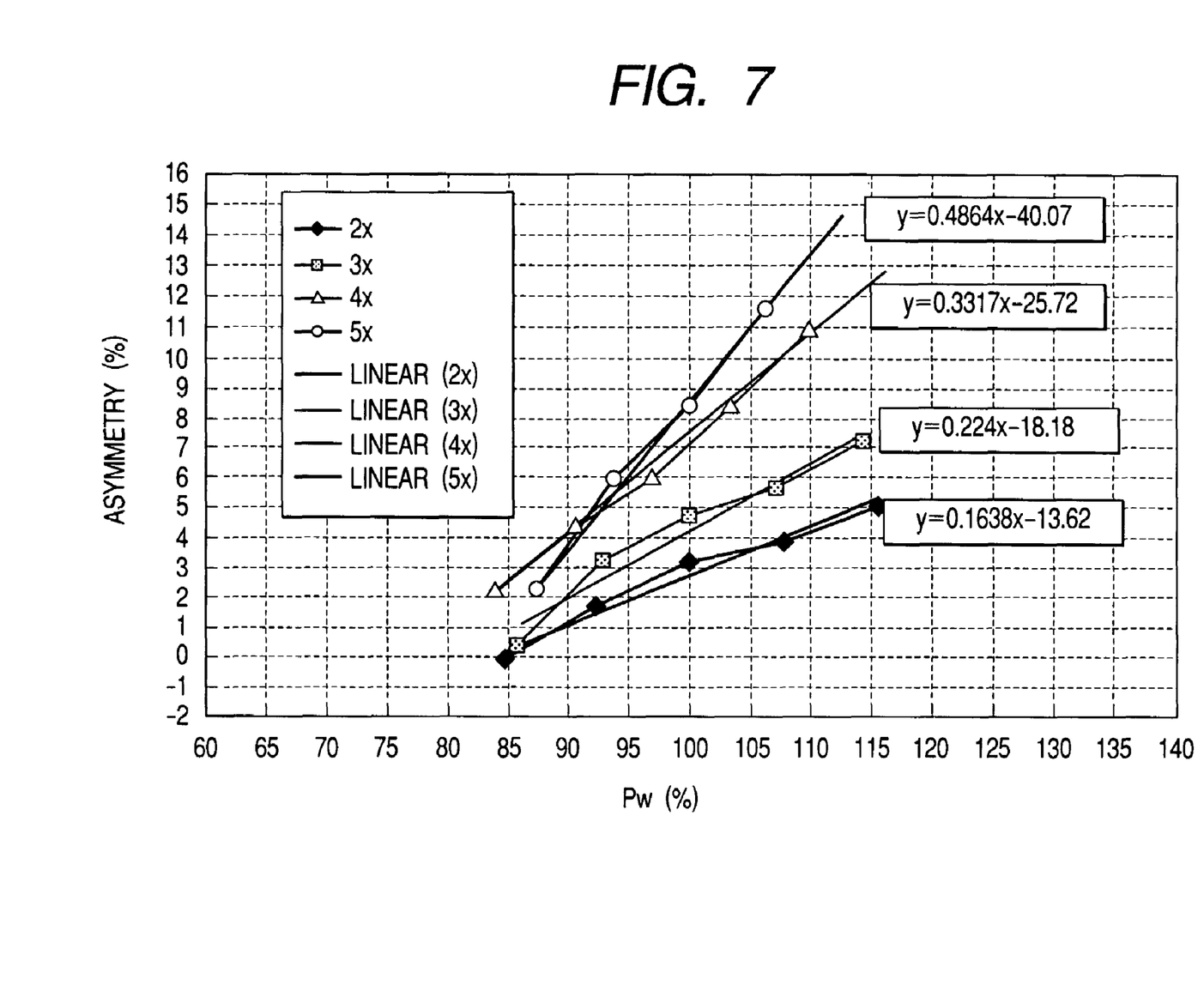
FIG. 7 is a graph showing how the asymmetry is dependent upon the normalized recording power for each linear recording velocity.

Then, FIG. 7 shows dependence of the asymmetry upon the recording power around the optimum recording power for each linear recording velocity. The horizontal axis represents the normalized recording power while the vertical axis represents the asymmetry. Different from FIG. 4, the asymmetry is plotted in a recording power range where the jitter is roughly suppressed to 8% or less as shown in FIG. 6. For each linear recording velocity, the asymmetry is plotted with a linear equation which approximates the asymmetry-to-recording power characteristic, where y represents the asymmetry and x represents the recording power Pw(%). As shown, the asymmetry is well approximated linearly in the vicinity of the optimum recording power. According to each linear approximation, the asymmetry at the optimum recording power Pw=100% is roughly 2.8% for a liner recording velocity of 2×, 4.2% for a liner recording velocity of 3×, 7.5% for a liner recording velocity of 4×, and 8.6% for a liner recording velocity of 5×.

In the method for determining the optical recording power, described with FIG. 4, a recording power threshold Pth to cause a jitter of 13% is multiplied by an optimum recording power coefficient which is previously recorded on the recording medium.

Meanwhile, as apparent from FIG. 7, it is possible to determine a recording condition by using the optimum recording power, the asymmetry at the optimum recording power and the change ratio of the asymmetry to the power (change ratio of the amplitude to the recording power) in the vicinity of the optimum recording power. If the optimum recording power, the asymmetry at the optimum recording power and the change ratio of the asymmetry to the power (change ratio of the amplitude to the recording power) in the vicinity of the optimum recording power are previously recorded on the recording medium, it is possible through an actual recording and reproducing operation to determine the recording power by checking the recorded asymmetry and calculating backwards the recording power from the difference between the recorded asymmetry and the asymmetry at the optimum recording power. For example, in the case of recording and reproducing at a linear velocity of 2×, assume that the reproduced signal shows an asymmetry of 5% if recording is done at the recorded recording power. According to the graph, this means that recording is done at 115% of the optimum recording power. Therefore, by lowering the recording power by about 15%, it is possible to achieve a target asymmetry of about 3% as well as high recording quality with the minimum jitter. In the case of another linear recording velocity, it is also possible to set the optimum recording power by calculating it from the asymmetry obtained by a similar recording and reproducing operation.

That is, if the optimum recording power, the asymmetry at the optimum recording power and the change ratio of the asymmetry to the power (change ratio of the amplitude to the recording power) in the vicinity of the optimum recording power are previously recorded on the recording medium, it is possible to secure higher precision recording quality than the optimum recording power determination method described with FIG. 4. This is because the error included in the detected threshold Pth as shown in FIG. 5 is much dependent on the SNR (Signal to Noise Ratio) of the optical information recording and reproducing apparatus. A poorer SNR results in a larger Pth and a larger recording power.

In the method described above, the optimum recording power, the asymmetry at the optimum recording power and the change ratio of the asymmetry to the power (change ratio of the amplitude to the recording power) in the vicinity of the optimum recording power, which are previously recorded on the recording medium, are directly used in the modification of the recording condition. Alternatively, however, it is also possible to check characteristics, such as those shown FIG. 7, of the information recording and reproducing apparatus by using a test area or the like of the recording medium after the recording condition is read from the recording medium. This can secure still higher precision recording quality since the change ratio of the asymmetry to the power is set according to characteristics of the information recording and reproducing apparatus. This method is very effective if the previously recorded information on the recording medium is not satisfactorily consistent with characteristics of the information recording and reproducing apparatus. In view of characteristic variations among apparatus and recording media, it is desirable to set the change ratio of the asymmetry to the power consistently with characteristics of the optical information recording and reproducing apparatus.

Figure 8:
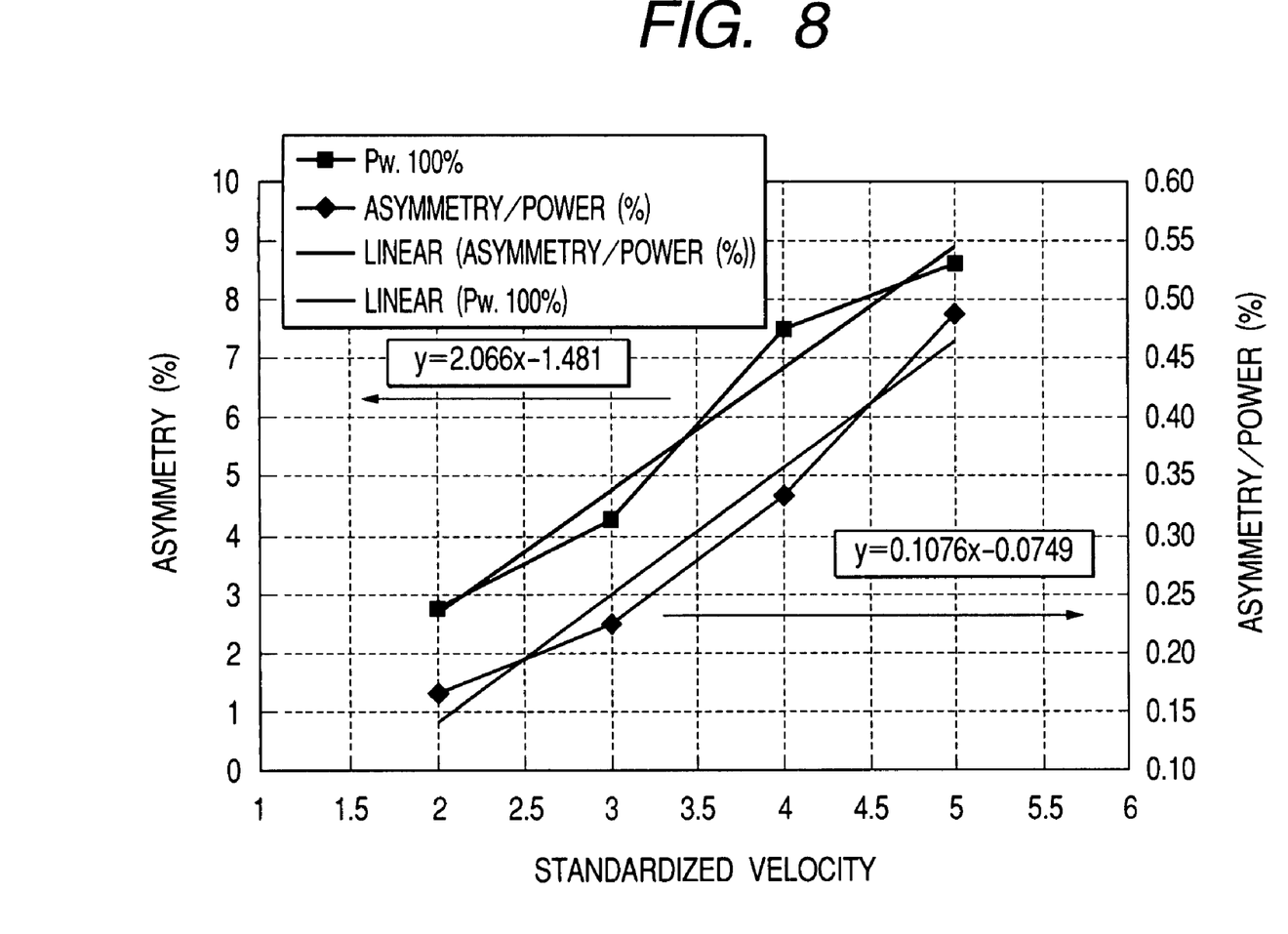
FIG. 8 is a graph showing how the asymmetry and the change ratio of the asymmetry to the power are dependent upon the normalized linear recording velocity.

FIG. 8 is derived from FIG. 7 and shows dependence of the asymmetry at the optimum recording power and the change ratio of the asymmetry to the power around the optimum recording power upon the linear recording velocity. The horizontal axis represents the normalized linear velocity while the left and right vertical axes respectively represent the asymmetry and the change ratio of the asymmetry to the power (Asymmetry/Power). Roughly, line velocity "2" means 8.2 m/s and "5" means 20.5 m/s. A linear equation shown left is a result of linearly approximating the characteristic of the asymmetry at recording power Pw=100%. Likewise, the other linear equation shown right approximates the characteristic of the change ratio of the asymmetry to the power. If information shown in FIG. 8 is previously recorded on the recording medium, the aforementioned method for setting the optimum recording power from the asymmetry can be used as described in FIG. 7. For example, if two asymmetry values at the recorded optimum recording power have been recorded respectively for linear recording velocities 2× and 5×, the asymmetry at the optimum recording power can be calculated for each linear recording velocity through linear approximation from the recorded two asymmetry data. As for the change ratio of the asymmetry to the power (Asymmetry/Power), it is also possible to calculate the change ratio of the asymmetry to the power through linear approximation for each linear recording velocity if two change ratio values have been recorded respectively for linear recording velocities 2× and 5×. In addition if the change ratio of the asymmetry to the linear velocity ("2.066" in the asymmetry linear equation in FIG. 8), the change ratio of the asymmetry to the power (Asymmetry/Power) for a certain linear velocity and the change ratio of the asymmetry to the linear velocity ("0.1076" in the Asymmetry/Power linear equation in FIG. 8) are previously recorded on the recording medium, it is also possible to use the aforementioned method for setting the optimum recording power from the asymmetry as described with FIG. 7. That is, if a recording medium has such recording condition data recorded previously thereon for the allowable range of the linear recording velocity, it is possible to set the optimum recording power with high accuracy for the recording medium.

Figure 9:
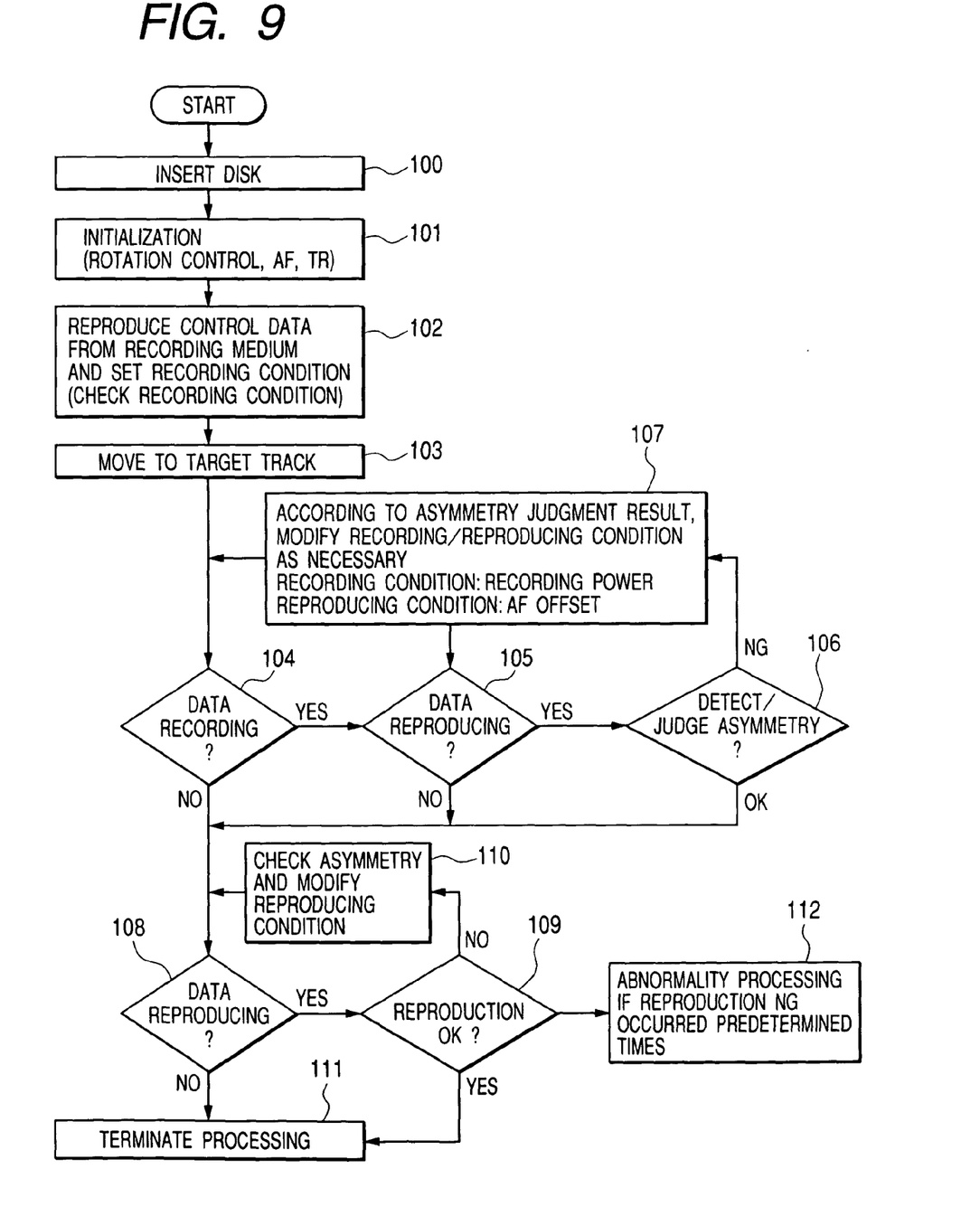
FIG. 9 is a block diagram showing flows of processing according to the present invention.

Then, referring to FIG. 9, let us describe the flows of processing performed by the optical information recording and reproducing apparatus shown in FIG. 1. If a disk is inserted in Step 100, the rotation control, AF offset, TR offset and so on are initialized in Step 101 to start the operation.

Then Step 102 retrieves control data from the recording medium 5 and sets the recording condition. Specifically, information (control data, etc.) previously recorded on the recording medium 5 is read and used by the controller 19 to set a recording condition to the laser driver 14, recording pulse generation circuit 15 and synthesizer 16 as the initial condition.

Usually, if the performance of the optical information recording and reproducing apparatus is consistent with the recording condition derived from the control data retrieved from the recording medium 5, the this recording condition is directly set. In view of characteristic variations among apparatus and recording media, however, the recording quality may be raised by checking the change ratio of the asymmetry to the power and the optimum recording power consistent with characteristics of the optical information recording and reproducing apparatus (recording condition check) and setting the determined consistent recording condition to the optical information recording and reproducing apparatus. Note that this recording condition check can be performed in a test area or the like prepared on the recording medium 5. Also note that the controller 19 sets the recording condition by controlling the laser driver 14, the recording pulse generation circuit 15 and the synthesizer 16.

Then the optical head is moved to a target track in Step 103 and data recording is performed in Step 104. To reproduce data after recorded, processing goes to Step 105 where data is reproduced.

Then the asymmetry is detected in Step 106. If the asymmetry is beyond a predetermined value, the recording condition is modified in Step 107. If the asymmetry falls within a predetermined range but the digital quality of the reproduced information is not within a predetermined range (for example, if a PI error occurs which informs of an error in the binary signal obtained from the reproduced signal), the reproducing condition (for example, the AF offset) is changed. This sequence is repeated to change the recording power until the asymmetry falls within the predetermined range.

If the asymmetry falls within the predetermined range, processing goes to Step 108 to reproduce data. If data reproduction is not necessary, processing is terminated in Step 111. Otherwise, data is reproduced in Step 108 and it is judged in Step 109 whether data can be reproduced properly. If data can be reproduced properly, processing is terminated in Step 111. If data cannot be read properly, processing goes to Step 110 to check the asymmetry and the number of PI errors, modify a reproducing condition and retry the reproducing operation. The reproducing condition allowed to be modified in this step may be designed to include, for example, the waveform equalizing condition as well as the AF offset.

When the recording condition is modified as a result of detecting the asymmetry, it is preferable to increment or decrement the least significant digit of the recorded data by one at a time. If the ambient temperature has widely changed remarkably (as sensed by a temperature sensor (not shown) incorporated in the controller 19), it is also preferable to use the information from the power monitor circuit 17 which always monitors the recording power in order to raise the reliability of the optimum recording condition to be set through detection of the asymmetry.

According to the present invention, it is possible to enhance the reliability of information recorded on an recording medium.

What is claimed is:

1. An information recording and reproducing apparatus which irradiates an information recording medium with oscillated laser light to form a recorded region in a recording area on the information recording medium, said recorded region being physically different from the region where information has not been recorded, so that information can be recorded onto the information recording medium and reproduced or erased therefrom, said apparatus comprising:

a detecting circuit configured to detect amplitude information from a reproduced signal formed by the oscillated laser light;

a converting circuit configured to convert the detected amplitude information to a digital signal; and a calculating circuit configured to calculate on the digital signal such that a recording condition of the oscillated laser light is adapted;

wherein the recording condition is previously recorded on the recording medium, the recording condition including a linear recording velocity of the oscillated laser light, a recording power of the oscillated laser light, amplitude information of the reproduced signal, an asymmetry of the recording power, a change ratio of the amplitude information to the recording power of the oscillated laser light, and a change ratio of the amplitude information to the linear recording velocity, and wherein the recording power for information recording and reproducing is adapted by using the recording condition recorded on the recording medium as amplitude information of the reproduced signal and the change ratio of the amplitude information to the recording power.

2. The information recording and reproducing apparatus according to claim 1, wherein the recording condition is adapted for a linear recording velocity by:

reading from the recording medium the recording condition recorded on the recording medium as amplitude information of the reproduced signal and the change ratio of the amplitude information to the recording power;

calculating a recording condition appropriate for the linear recording velocity by using amplitude information of the reproduced signal associated with at least two linear recording velocities and the change ratio of the amplitude information to the recording power; and setting the recording power accordingly for information recording and reproducing at said linear recording velocity.

3. The information recording and reproducing apparatus according to claim 1, wherein the recording condition is adapted by:

reading from the recording medium the recording condition recorded on the recording medium as amplitude information of the reproduced signal and the change ratio of the amplitude information to the recording power;

before recording normal information, obtaining the change ratio of the amplitude information to the recording power, which is appropriate to the apparatus; and during recording normal information, adapting the recording power for information recording and reproducing by using the obtained change ratio of the amplitude information to the recording power.

4. The information recording and reproducing apparatus according to claim 1, wherein the recording condition is adapted for a linear recording velocity by:

reading from the recording medium the recording condition recorded on the recording medium as amplitude information of the reproduced signal and the change ratio of the amplitude information to the recording power;

before recording normal information, obtaining the change ratio of the amplitude information to the recording power for at least two linear recording velocities, which is appropriate to the apparatus;

calculating a recording condition appropriate for said linear recording velocity by using the obtained change ratios; and during recording normal information, adapting the recording power for information recording and reproducing by using the obtained change ratio of the amplitude information to the recording power.

5. A computer-readable information recording medium in which information can be recorded onto the information recording medium and reproduced or erased therefrom by irradiating the information recording medium with oscillated laser light to form a recorded region in a recording area on the information recording medium, said recorded region being physically different from the region where information has not been recorded, wherein:

a recording condition comprising at least a linear recording velocity, recording power and amplitude information of the reproduced signal is previously recorded; and information about the change ratio of the amplitude information to the recording power at said linear recording velocity is previously recorded.

6. A computer-readable information recording medium in which information can be recorded onto the information recording medium and reproduced or erased therefrom by irradiating the information recording medium with oscillated laser light to form a recorded region in a recording area on the information recording medium, said recorded region being physically different from the region where information has not been recorded, wherein:

a recording condition comprising at least a plurality of linear recording velocities, a plurality of recording powers and a plurality of pieces of amplitude information of the reproduced signal is previously recorded; and information about the change ratio of the amplitude information to the recording power at each of the plurality of linear recording velocities is previously recorded.

7. A computer-readable information recording medium in which information can be recorded onto the information recording medium and reproduced or erased therefrom by irradiating the information recording medium with oscillated laser light to form a recorded region in a recording area on the information recording medium, said recorded region being physically different from the region where information has not been recorded, wherein:

a recording condition comprising at least a plurality of linear recording velocities, a plurality of recording powers and a plurality of pieces of amplitude information of the reproduced signal is previously recorded; and information about the change ratio of the amplitude information to the recording power at a linear recording velocity in the recording-possible linear recording velocity range and information about the change ratio of the amplitude information to the linear recording velocity in the recording-possible linear recording velocity range are previously recorded.

* * * * *